United States Patent
Ishidoshiro (10) Patent No.: US 9,979,787 B2
(45) Date of Patent: May 22, 2018

(54) INFORMATION PROCESSING SYSTEM, NETWORK STORAGE DEVICE, AND NON-TRANSITORY RECORDING MEDIUM

(71) Applicant: BUFFALO INC., Nagoya-shi (JP)

(72) Inventor: Takashi Ishidoshiro, Nagoya (JP)

(73) Assignee: BUFFALO INC., Nagoya-shi (JP)

(*) Notice: Subject to any disclaimer, the term of this patent is extended or adjusted under 35 U.S.C. 154(b) by 210 days.

(21) Appl. No.: 14/789,558

(22) Filed: Jul. 1, 2015

(65) Prior Publication Data

US 2016/0014201 A1   Jan. 14, 2016

(30) Foreign Application Priority Data

Jul. 9, 2014   (JP) ................................ 2014-141341

(51) Int. Cl.
*G06F 15/167* (2006.01)
*H04L 29/08* (2006.01)

(52) U.S. Cl.
CPC ...... *H04L 67/1097* (2013.01); *H04L 67/1095* (2013.01)

(58) Field of Classification Search
CPC .................. H04L 67/1097; H04L 67/1095
See application file for complete search history.

(56) References Cited

U.S. PATENT DOCUMENTS

| | | | | |
|---|---|---|---|---|
| 7,461,230 B1* | 12/2008 | Gupta | ............... | G06F 11/2082 711/162 |
| 9,215,158 B1* | 12/2015 | Adogla | ............ | H04L 29/08144 |
| 2006/0218370 A1 | 9/2006 | Satoyama et al. | | |
| 2006/0259957 A1* | 11/2006 | Tam | ................ | G06F 21/10 726/3 |
| 2011/0022568 A1* | 1/2011 | Kim | ................. | G06F 17/30073 707/640 |
| 2012/0239792 A1* | 9/2012 | Banerjee | ............ | H04L 67/1097 709/223 |
| 2015/0373119 A1* | 12/2015 | Kaneko | ............... | H04L 67/1097 709/219 |

FOREIGN PATENT DOCUMENTS

| | | |
|---|---|---|
| JP | 2003-316647 | 11/2003 |
| JP | 2006-302253 | 11/2006 |

OTHER PUBLICATIONS

Inet: アイ・オー・データ社、"富士ゼロックスクラウドサービス [Working Folder] とアイ・オー製ネットワークハードディスク(NAS)との同期機能を提供開始", [online], 2013年11月27日, [2014年3月30日検索], インターネット < URL: http://www.iodata.jp/news/2013/information/hdl-xrw_wf.htm>.

* cited by examiner

*Primary Examiner* — Brian Whipple
(74) *Attorney, Agent, or Firm* — Oblon, McClelland, Maier & Neustadt, L.L.P.

(57) ABSTRACT

A network storage device that includes a plurality of storage regions configured to store data; and circuitry that selects at least one of the storage regions in accordance with instruction information, and synchronizes data stored in the at least one of the storage regions with a server connected to the network storage device via a network.

17 Claims, 4 Drawing Sheets

| APPLICATION-IDENTIFYING INFORMATION | REGION |
|---|---|
| MUSIC PLAYER APPLICATION | R a |
| VIDEO PLAYER APPLICATION | R b |
| ⋮ | ⋮ |

INFORMATION PROCESSING SYSTEM, NETWORK STORAGE DEVICE, AND NON-TRANSITORY RECORDING MEDIUM

CROSS REFERENCE TO RELATED APPLICATION

The present disclosure contains subject matter related to that disclosed in Japanese Patent Application No. 2014-141341 filed in the Japan Patent Office on Jul. 9, 2014, the entire content of which is hereby incorporated by reference.

TECHNICAL FIELD

The present disclosure relates to an information processing system including a network storage device such as a network attached storage (NAS), to a network storage device, and to a non-transitory recording medium.

RELATED ARTS

In recent years, it has become a widespread practice to share locally stored data through so-called cloud services so that the data may be accessed easily by users while on the road or the like. The data for personal use such as locally stored music data may be uploaded to a server offering a cloud service (called the cloud server hereunder) so that the data can be accessed by the user on the road.

For example, there is a known technique whereby the data stored in a specific holder set on the NAS is synchronized with the cloud server (i.e., the data in the folder is uploaded to the cloud server while the data that only exists on the cloud server is downloaded to the specific folder), so that the data may be accessed by the user on the road.

However, the existing technique cited above allows the data in the holder to be uploaded to the cloud server only from the local side and does not envisage cases where the data need to be updated by the user on the road. That means the data stored in the folder remains unchanged on the cloud server until the setting involved is altered.

Generally, devices such as smartphones used to process data outdoors have limited data storage capacity, so that there exists a need to utilize the cloud server effectively. However, the cloud server is usually limited in storage capacity. In such a case, the storage capacity of the cloud server cannot be utilized effectively as long as the data uploaded from the local side to the server remains unchanged until the setting in effect is altered from the local side.

The present disclosure has been made in view of the above circumstances. An object of the disclosure is to provide an information processing system that can effectively utilize the storage capacity of the server of a cloud service, a network storage device, and a non-transitory recording medium.

SUMMARY

According to one aspect of the present disclosure, there is provided a network storage device that includes a plurality of storage regions configured to store data; and circuitry that selects at least one of the storage regions in accordance with instruction information, and synchronizes data stored in the at least one of the storage regions with a server connected to the network storage device via a network.

BRIEF DESCRIPTION OF DRAWINGS

Further objects and advantages of the present disclosure will become apparent upon a reading of the following description and appended drawings in which.

DESCRIPTION OF THE DISCLOSURE

Figure 1:
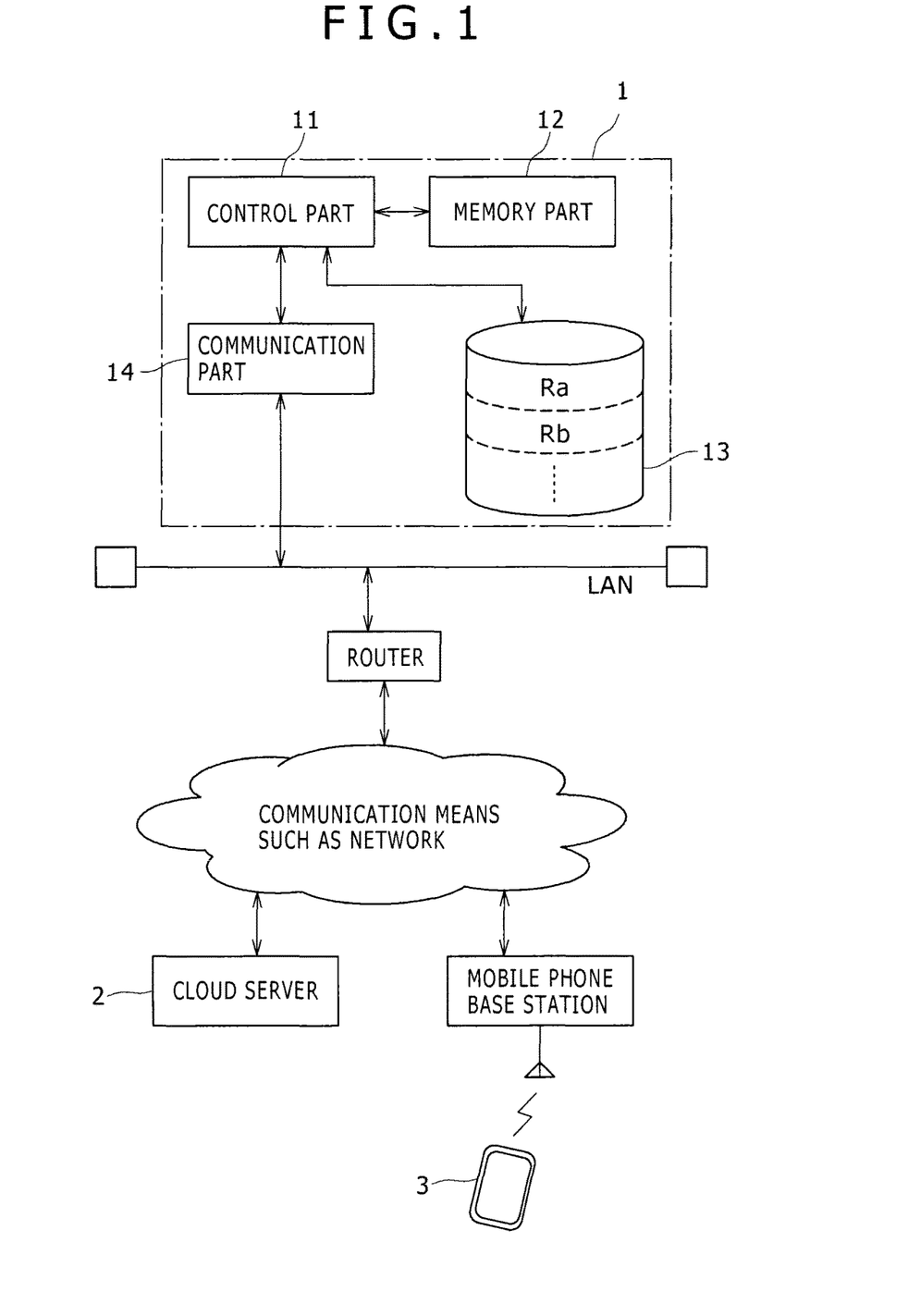
FIG. 1 is a block diagram showing a typical configuration of an information processing system according to one aspect of an embodiment of the present disclosure.

The preferred embodiment of the present disclosure will now be described with reference to the accompanying drawings. As shown in FIG. 1, an information processing system according to one aspect of the embodiment is configured to include a network storage device 1, a cloud server 2, and a terminal 3.

Specifically, the network storage device 1 is a NAS that includes a control part 11, a memory part 12, a storage part 13, and a communication part 14. With this embodiment, it is assumed that multiple storage regions are set on the storage part 13.

The control part 11 is a program control device such as a central processing unit (CPU) that operates in accordance with a program stored in the memory part 12. In this embodiment, the control part 11 functions as a selection part and a synchronization part. On the basis of a predetermined instruction or information, the selection part selects at least one of the multiple storage regions as the region targeted for synchronization (called the synchronization target region hereunder). The synchronization part synchronizes the data stored in the selected storage region (synchronization target region) with a server device connected via a network (cloud server 2 in this embodiment). Synchronization in this context means to upload the data stored in the synchronization target region to the cloud server and to download data that exists only on the cloud server to the synchronization target region. If data having the same identification name exists both on the cloud server and in the synchronization target region, processing such as the following may be carried out: The update times and dates of the data on both sides are compared to determine the side storing the new data that is then transferred to the side storing the old data, so that the latter side will overwrite its data with the new data. The workings of the control part 11 will be discussed later in more detail.

The memory part 12 is a memory device including a nonvolatile memory that retains the program to be executed by the control part 11. This program may be offered stored on a computer-readable non-transitory recording medium and copied from there to the memory part 12. Alternatively, the program may be distributed via the network before being stored into the memory part 12. The memory part 12 also serves as a work memory for the control part 11.

Figure 2:
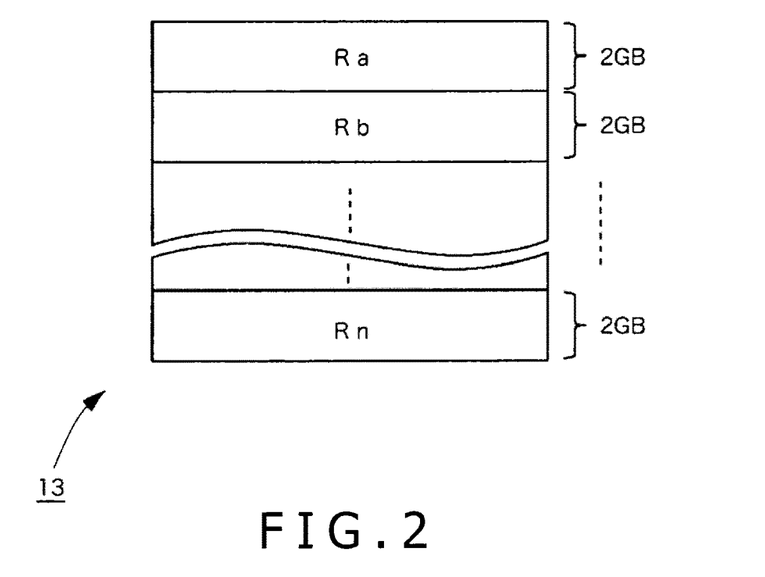
FIG. 2 is an explanatory diagram showing typical storage regions set on a network storage device according to one aspect of the embodiment.

The storage part 13 is structured to include a disc device such as a hard disc drive (HDD) or a solid-state drive (SSD). As mentioned above, multiple storage regions are set on the storage part 13. Specifically, as shown in FIG. 2, multiple storage regions Ra, Rb, etc., are set in a storage area of the storage part 13 in this embodiment, each of the storage regions having a size which is equal to or smaller than the server storage capacity offered by the could service and which can be synchronized with the cloud server 2. The size of each of the regions Ra, Rb, etc., may be equal to or smaller than 1/N (N is a natural number of at least 2) of the storage capacity provided by the cloud server 2. In this case, as many as N regions can be selected as the synchronization target so that the data in the selected multiple regions can be synchronized with the cloud server 2.

The communication part 14 may be a network interface for example. In accordance with instructions input from the control part 11, the communication part 14 outputs data to the cloud server 2 via the network (wide area network (WAN)). The communication part 14 also outputs the data received via the network to the control part 11. The communication part 14 is connected to a wired or wireless local area network (LAN) and a router on the LAN allows the communication part 14 to connect with the network. The method by which the network storage device 1 communicates with the cloud server 2 on the network via the router is a widely known technique and thus will not be discussed further.

The cloud server 2 is a server device that offers the cloud service, such as a Dropbox (registered trademark) server. Using the cloud server 2, the administrator of this cloud service offers a data storage service that allows users to store their data into a storage area of which the size (storage capacity) is determined beforehand for each user.

The cloud server 2 authenticates each user, receives the data designated by the authenticated user from the network storage device 1 or from the terminal 3, and retains the received data. Also, in accordance with an instruction received via the network from the terminal 3 used by the authenticated user, the cloud server 2 outputs the retained data to the terminal 3 that has sent the instruction.

The terminal 3 may be a smartphone, a personal computer or the like. The terminal 3 communicates with the cloud server 2 via a wired or wireless communication channel so as to request data held on the cloud server 2 and receive the data transmitted from the cloud server 2 in response to the request. Also, the terminal 3 subjects the received data to predetermined processing.

According to one aspect of the embodiment, the cloud server 2 holds multimedia data such as music data and video data uploaded from the network storage device 1. An application program for reproducing multimedia data is run on the terminal 3. In accordance with the user's instructions, the terminal 3 may acquire multimedia data from the cloud server 2 and reproduce the acquired data. The terminal 3 may also be arranged to output predetermined information such as an instruction to the network storage device 1 via the network.

Figure 3:
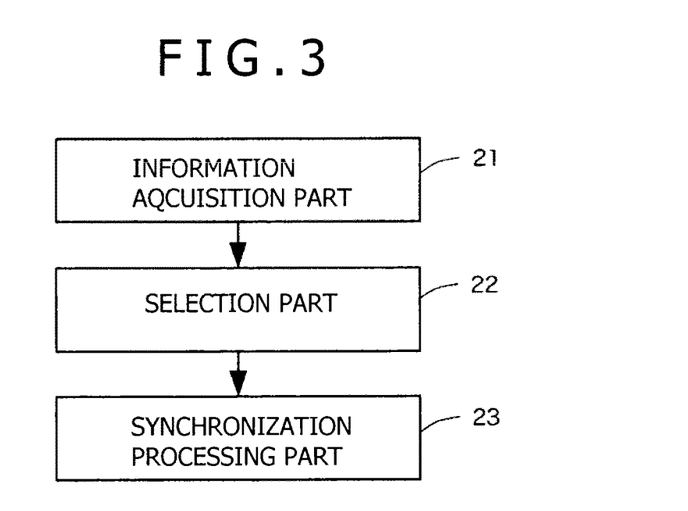
FIG. 3 is a function block diagram showing a typical control part of the network storage device according to one aspect of the embodiment.

How the control part 11 of the network storage device 1 works is explained below. In functional terms, the control part 11 according to one aspect of the embodiment is structured to include an information acquisition part 21, a selection part 22, and a synchronization processing part 23, as shown in FIG. 3.

The information acquisition part 21 receives various kinds of information via the network. An example of the information received by the information acquisition part 21 may be the instruction for selecting at least one of the regions set on the storage part 13 as the synchronization target region. If the received information is a predetermined kind of information serving as a predetermined instruction or information related to selecting the synchronization target region (called the condition-related information hereunder), the information acquisition part 21 outputs the received condition-related information to the selection part 22. On the basis of the condition-related information input from the information acquisition part 21, the selection part 22 selects at least one of the storage regions set on the storage part 13 as the synchronization target region.

The condition-related information related to selecting the synchronization target region may be solely the information that identifies the region to be used as the synchronization target region. According to one aspect of the embodiment, the network storage device 1 may receive the condition-related information directly from the terminal 3. If the condition-related information is received directly from the terminal 3, the information acquisition part 21 outputs the received condition-related information to the selection part 22. The selection part 22 selects at least one region as the synchronization target region on the basis of the condition-related information, and outputs the result of the selection to the synchronization processing part 23. Specifically, if the received condition-related information is the information that identifies the region to be used as the synchronization target region, the selection part 22 selects the region designated by the condition-related information as the synchronization target region, and outputs the result of the selection to the synchronization processing part 23.

In another example according to one aspect of the embodiment, the network storage device 1 receives the condition-related information indirectly from the terminal 3 via the cloud server 2. In this case, the terminal 3 may upload the condition-related information to a predetermined storage location of the cloud server 2, for example. The storage location is assumed to have been set beforehand both in the terminal 3 and on the network storage device 1 by use of a path name derived from the root directory of the cloud server 2.

The information acquisition part 21 of the network storage device 1 determines repeatedly whether or not the condition-related information is stored in the predetermined storage location mentioned above. If it is determined that the condition-related information is stored on the cloud server 2, the network storage device 1 acquires the condition-related information. On the basis of the acquired condition-related information, the selection part 22 selects at least one region as the synchronization target region and outputs the result of the selection to the synchronization processing part 23. Specifically, also in this case, if the received condition-related information is the information itself that identifies the region to be used as the synchronization target region, the selection part 22 selects the region designated by the condition-related information as the synchronization target region, and outputs the result of the selection to the synchronization processing part 23. In this embodiment, the method for selecting the synchronization target region is not limited to the above-described example. Other examples will be discussed later.

From the selection part 22, the synchronization processing part 23 accepts information indicating the result of the selection identifying the region selected as the synchronization target region. At this point, the synchronization processing part 23 deletes the relevant data held on the cloud server 2. The synchronization processing part 23 uploads to the cloud server 2 the data stored in the synchronization target region designated as the result of the selection, so that the cloud server 2 will store the uploaded data anew. In this manner, the data stored on the cloud server 2 is synchronized with the data in that region of the storage part 13 which is determined as the new synchronization target region.

The information processing system including the network storage device 1 according to one aspect of the embodiment and structured as described above operates as explained below. It is assumed for explanation purposes that the user on the road successively acquires and reproduces large-size music data from high-resolution sound sources (i.e., the data generally having a sampling frequency or a quantization bit rate exceeding at least either the sampling frequency or the quantization bit rate defined by the compact disc digital audio (CD-DA) standard, typically the data sampled at the sampling frequency of 96 kHz or 192 kHz and at the quantization bit rate of 24 bits or thereabout).

In the example that follows, the capacity of the cloud server 2 is assumed to be 2 GB per user. If derived from a high-resolution sound source, music data of even a one-minute duration can exceed 40 MB in size. For this reason, the data exceeding the 50-minute duration cannot be recorded to the cloud server 2. Thus in the ensuing example, the user divides beforehand the data from high-resolution sound sources into music groups of about 40 minutes each, and records the data of each music group to each of the 2-GB regions Ra, Rb, etc., set on the storage part 13.

Figure 4:
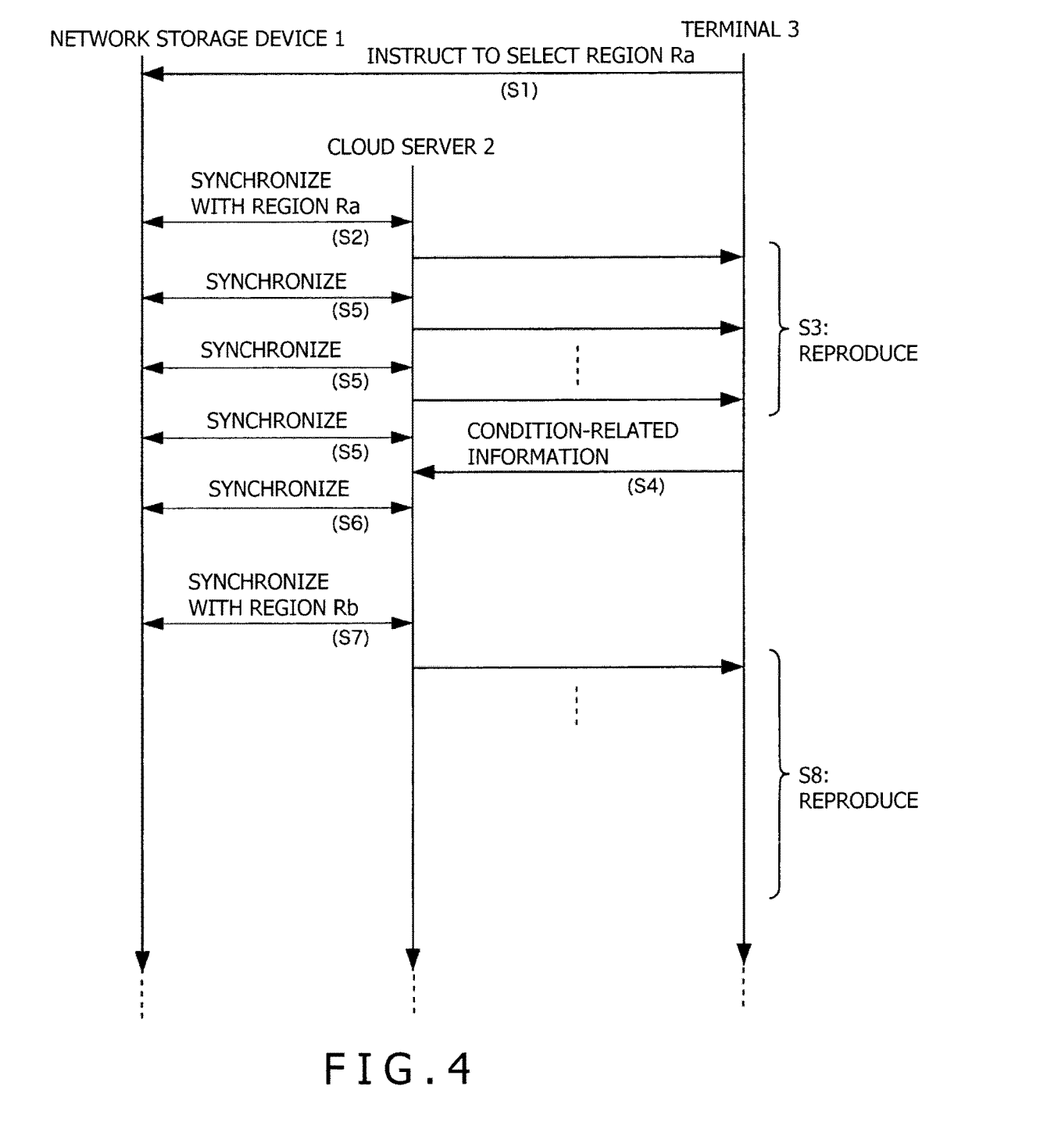
FIG. 4 is a flowchart showing typical operations of the information processing system according to one aspect of the embodiment.

As shown in FIG. 4, the user initially instructs the network storage device 1 from the terminal 3 via the network to select the region Ra of the storage part 13 as the synchronization target region (S1). In response to this instruction, the network storage device 1 uploads the music data held in the region Ra to the cloud server 2 (S2).

Thereafter, the user operates the terminal 3 to communicate with the cloud server 2 to acquire and reproduce the music data stored on the cloud server 2 (S3). After reproduction of all music data held on the cloud server 2 is completed, the terminal 3 uploads the condition-related information identifying the region to be used as the next synchronization target region to a predetermined storage location of the cloud server 2. It is assumed here that the terminal 3 uploads the condition-related information identifying, for example, the region Rb as the region to be used as the next synchronization target region (S4).

The network storage device 1 synchronizes the data on the cloud server 2 with the data in the region Ra currently used as the synchronization target region at predetermined timing (e.g., at predetermined time intervals)(S5). If the synchronization is performed after the terminal 3 has uploaded the condition-related information in step S4, the condition-related information is downloaded to the region Ra (S6).

With the data in the region Ra synchronized, the network storage device 1 determines repeatedly whether or not there exists the condition-related information at the position corresponding to the predetermined storage location mentioned above. Following the download in step S6, the condition-related information is found to exist.

The network storage device 1 extracts information indicating the region Rb to be used as the next synchronization target region from the condition-related information downloaded in step S6, and uploads the data held in the region Rb to the cloud server 2 to substitute for the data retained on the cloud server 2 at that point in time (S7: synchronization with the content of the region Rb). This enables the terminal 3 to acquire and reproduce the music data in the region Rb from the cloud server 2 (S8). It should be noted that in step S7, the network storage device 1 deletes the condition-related information that was downloaded to the region Ra used until then as the synchronization target region.

It was explained above that the terminal 3 designates the synchronization target region for the network storage device 1 via the cloud server 2 by storing the condition-related information into the cloud server 2. Alternatively, if direct communication is possible between the terminal 3 and the network storage device 1 via the network (e.g., via virtual private network (VPN) or by use of email), the terminal 3 may transmit the condition-related information directly to the network storage device 1.

Also according to one aspect of the embodiment, the terminal 3 may transmit to the network storage device 1 the condition-related information including not the information identifying the region to be used as the next synchronization target region but instructions specifying that the synchronization target region be changed instead of the information identifying the region to be used as the next synchronization target region.

In this example, the user prepares information representing the sequence in which the regions are changed and stores that information into the network storage device 1 beforehand. Specifically, if the region is changed from Ra to Rc to Rb, the user prepares the sequence information indicating the sequence of change of the regions and stores that sequence information into the memory part 12 of the network storage device 1 in advance.

Every time the network storage device 1 receives from the terminal 3 the condition-related information giving the instruction specifying that the synchronization target region be changed, the network storage device 1 references the sequence information indicative of the region change sequence and thereby identifies the region to be used as the next synchronization target region. In this case, the terminal 3 may upload the condition-related information including the instruction to change the synchronization target region to a predetermined storage location of the cloud server 2 or transmit the condition-related information directly to the network storage device 1.

Also according to another aspect of the embodiment, the condition-related information received by the network storage device 1 need not be solely the information itself identifying the region to be used as the synchronization target region.

Figure 5:
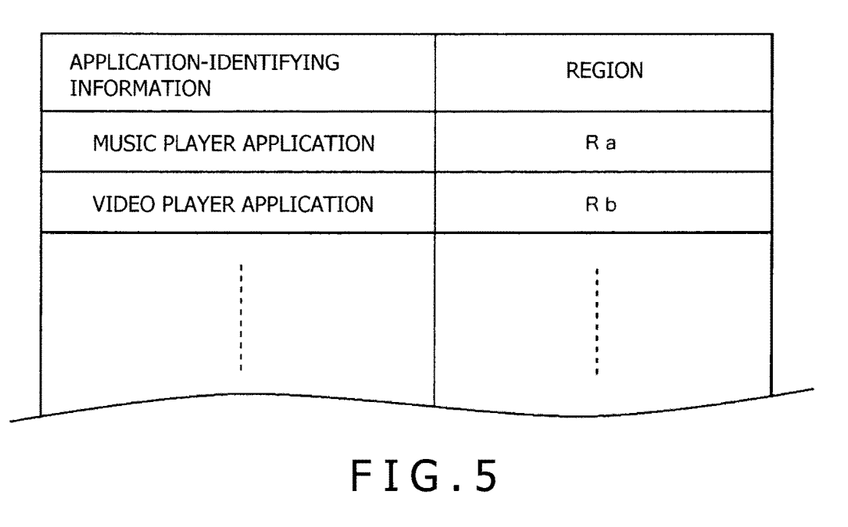
FIG. 5 is an explanatory diagram showing typical information retained by the network storage device according to one aspect of the embodiment.

In an example of the information processing system according to another aspect of the embodiment, the condition-related information may be information that identifies the application for processing the data received by the terminal 3 from the cloud server 2. In this example, the terminal 3 stores into the memory part 12 of the network storage device 1 the information identifying the region to be used as the synchronization target region in relation to the information which identifies a predetermined application (such as the type and name of the application) to process the data which is acquired from the cloud server 2 (FIG. 5). One such application for processing the data acquired by the terminal 3 from the cloud server 2 may involve reproducing music data (i.e., music player application); another such application may be aimed at reproducing videos (i.e., video player application).

The terminal 3 transmits directly to the network storage device 1 the condition-related information including the information identifying the application used to process the information acquired from the cloud server 2. In this case, the information acquisition part 21 of the network storage device 1 outputs the received condition-related information to the selection part 22. In turn, the selection part 22 reads from the memory part 12 the information which identifies the region to be used as the synchronization target region and which is stored in relation to the application-identifying information included in the received condition-related information. The selection part 22 proceeds to select the region identified by the information as the synchronization target region and output the result of the selection to the synchronization processing part 23.

In another example, the terminal 3 transmits to the network storage device 1 via the cloud server 2 the condition-related information including the information identifying the application used to process the information acquired from the cloud server 2. In this case, the terminal 3 uploads to, for example, a predetermined storage location of the cloud server 2 the condition-related information including the information identifying the application used to process the information acquired from the cloud server 2. The information acquisition part 21 of the network storage device 1 determines repeatedly whether or not the condition-related information is downloaded from the predetermined storage location. If it is determined that the condition-related information is downloaded, the information acquisition part 21 of the network storage device 1 acquires the condition-related information, reads the information identifying the application from the acquired information, and outputs the retrieved information to the selection part 22. The selection part 22 reads from the memory part 12 the information which identifies the region to be used as the synchronization target region and which is stored in relation to the input information identifying the application. The selection part 22 in turn selects the region identified by the information as the synchronization target region and outputs the result of the selection to the synchronization processing part 23.

In this example, the information acquisition part 21 of the control part 11 functions as an acquisition part that acquires the information identifying the application program currently executed on the terminal 3 that uses the data synchronized with an external server device (i.e., cloud server 2 according to another aspect of the embodiment).

In this example according to another aspect of the embodiment, the user classifies the data to be synchronized with the cloud server 2 into items by the information identifying each application for processing the data (e.g., types and names of applications), and stores the classified data items into different regions Ra, Rb, etc. Specifically, the user may store the music data to be processed by the music player application into the region Ra, the video data to be processed by the video player application into the region Rb, and so on. Also, the user may store into the memory part 12 the information identifying the region Ra in relation to the information identifying the music player application, and the information identifying the region Rb in relation to the information identifying the video player application.

When the user operates the terminal 3 to start the music player application, the terminal 3 transmits the information identifying the music player application to the network storage device 1 either directly or indirectly via the cloud server 2. The network storage device 1 receives the information sent from the terminal 3, and reads from the memory part 12 the information stored therein in relation to the information which is included in the received information and which identifies the application. The network storage device 1 selects the region identified by the retrieved information as the synchronization target region, and uploads to the cloud server 2 the data held in the region selected as the new synchronization target region in order to substitute for the data retained on the cloud server 2 at that point in time.

If the memory part 12 does not store the information which identifies the region to be used as the synchronization target region and which is stored in relation to the application-identifying information input from the information acquisition part 21, the selection part 22 stops the process of changing the synchronization target region at that point in time. As a result of this, with the terminal 3 operating under a multitask operating system for example, even if the user starts an application that does not use any data on the cloud server 2 (e.g., email application) after starting the music player application, the synchronization target region is prevented from getting changed.

In the foregoing paragraphs, it was explained that when the synchronization target region is changed, the synchronization processing part 23 of the network storage device 1 deletes the data stored in the old synchronization target region and uploaded to the cloud server 2 and uploads instead the data stored in the new synchronization target region to the cloud server 2.

However, it so happens that in Japan, the copyright protection and management system has been introduced (so-called dubbing 10) with regard to video content. Under this system, the number of times data can be copied is limited to nine; at the 10th time, the data can only be moved, not copied. If the uploaded data complies with the dubbing-10 system, the data can only be used up to ten times before being deleted.

Thus according to another aspect of the embodiment, when the synchronization target region is changed, the network storage device 1 determines whether or not the data held in the old synchronization target region and uploaded to the cloud server 2 includes any data complying with the dubbing-10 system. If such data is found to exist, the data uploaded to the cloud server 2 is deleted (the data is set to be unreproducible) and a data copy count in the storage part 13 which corresponds to the deleted data is incremented by 1. Whereas the preceding and current paragraphs have discussed the processing in the case of compliance with the dubbing-10 system, similar processing may also be performed on the data complying with other copyright protection and management systems involving the copy count.

Further in an example according to another aspect of the embodiment, the network storage device 1 may synchronize not with the cloud server 2 but with a memory device such as a flash memory or a secure digital (SD) card on the terminal 3. In this case, the presence of the cloud server 2 is not mandatory.

Where the communication part 14 of the network storage device 1 is connected to the network (WAN) via a LAN and a router, the network address of the LAN is set in the communication part 14. In this case, while the control part 11 of the network storage device 1 synchronizes the data held in the synchronization target region with an external server device (cloud server 2) connected via the network, the control part 11 determines whether or not the network address of the terminal 3 is the network address of the LAN (i.e., the same network address set in the communication part 14).

If it is determined that the network address of the terminal 3 is the network address of the LAN, the control part 11 may be arranged to wait, i.e., to not synchronize the data held in the synchronization target region with the cloud server 2 that is an external server device connected via the network, until an explicit instruction is given by the user on the terminal 3.

In this case, only when the explicit instruction is given by the user on the terminal 3, does the control part 11 synchronize the data held in the synchronization target region with the cloud server 2 that is an external server device connected via the network.

In this example, when the user possessing the terminal 3 is in the same place where the network storage device 1 is installed such as the user's home, the network storage device 1 does not synchronize with the cloud server 2. However, if the user of the terminal 3 explicitly gives an instruction to synchronize, the network storage device 1 performs the process of synchronization with the cloud server 2.

An example where the user explicitly gives the instruction for synchronization may be where the user planning to go out carrying the terminal 3 gives the explicit instruction to synchronize before going on the road.

The network storage device 1 may be an integrally formed device such as a NAS, or may be a device combined with a communication device such as an access point or a router of a wireless LAN and with a storage device such as a hard disc drive or a memory card reader-writer. In such an example, the communication device acts as the control part 11, memory part 12 and communication part 14, and the storage device serves as the storage part 13.

In this case, the storage device acting as the storage part 13 may be composed of more than one device. For example, the router serving as the communication device may be connected with both the hard disc drive and the memory card reader-writer. Alternatively, the router may be connected with multiple hard disc drives.

In such cases, the router or the like serving as the control part 11 may use each of the connected multiple storage devices as a storage region, or may have only one of the storage devices furnished with multiple storage regions. As another alternative, each of the multiple (N) storage devices (i=1, 2, . . . , M (M≤N) devices) may be equipped with multiple storage regions (as many as ki storage regions on the i-th storage device, where ki≥1 and at least one of ki is at least 2), so that a total of Σki=k1+k2+ . . . +kM storage regions may be established, of which at least one may be selected as the synchronization target region.

[Newly Added]

The information processing system or the like according to present disclosure provides the following characteristic features:

According to another aspect of the present disclosure, there is provided a network storage device having multiple storage regions and including: a selection part that selects any of the storage regions in accordance with a specific instruction or information, and a synchronization part that synchronizes data stored in the selected storage region with a server device connected via a network.

Preferably, the selection part may select any of the storage regions in accordance with an instruction from a terminal connected via the network. The selection part may also select any of the storage regions in accordance with an instruction acquired from the server device.

Preferably, the network storage device according to another aspect of the present disclosure may further include an acquisition part that acquires information identifying an application program being executed on a terminal utilizing the data synchronized with the server device. The selection part may select any of the storage regions in accordance with the information acquired by the acquisition part.

According to a further aspect of the present disclosure, there is provided a non-transitory recording medium storing a program for causing a network storage device having multiple storage regions to function as parts including: a selection part configured to select any of the storage regions in accordance with a specific instruction or information, and a synchronization part configured to synchronize data stored in the selected storage region with a server device connected via a network.

According to the present disclosure, where a cloud service is utilized, the storage capacity of the server of that service can be used effectively.

It should be understood by those skilled in the art that various modifications, combinations, sub-combinations and alterations may occur depending on design requirements and other factors in so far as they are within the scope of the appended claims or the equivalents thereof.

For example, in the foregoing aspect, the network storage device 1 is formed by a plurality of hardware elements. However, part of operation of the hardware elements can also be realized by operation of a program by the control part 11 or the like.

What is claimed is:

1. A network storage device comprising:
   a plurality of storage regions configured to store data; and
   circuitry configured to:
   select at least one of the storage regions in accordance with instruction information from a terminal connected to the network storage device via a network;
   determine whether a network address of the terminal is the same as a network address of the network storage device;
   when the circuitry determines the network address of the terminal is not the same as the network address of the network storage device, synchronize data stored in the at least one of the storage regions with a server connected to the network storage device via the network; and
   when the circuitry determines the network address of the terminal is the same as the network address of the network storage device, synchronize data stored in the at least one of the storage regions with a server connected to the network storage device via the network only when an instruction from the terminal is received by the circuitry, and refrain from synchronizing the data stored in the at least one of the storage regions with the server until the instruction from the terminal is received by the circuitry.

2. The network storage device according to claim 1, wherein the circuitry receives the instruction information from the terminal via the server.

3. The network storage device according to claim 2, wherein the circuitry receives the instruction information from the terminal via the server by determining repeatedly whether the instruction information is stored in a predetermined storage location of the server.

4. The network storage device according to claim 1, wherein the circuitry selects the at least one of the storage regions in accordance with the instruction information acquired from the server.

5. The network storage device according to claim 1, wherein
   the circuitry acquires information identifying an application program being executed on a terminal receiving the data synchronized with the server, and
   the circuitry selects the at least one of the storage regions in accordance with the information identifying the application program.

6. The network storage device according to claim 5, wherein the information identifying the application program identifies a type of the application program, and the circuitry selects the at least one of the storage regions in accordance with the type of the application program.

7. The network storage device according to claim 5, wherein the information identifying the application program identifies whether the application program is a music player application program or a video player application program, and the circuitry changes the at least one of the storage regions in accordance with the information identifying the application program.

8. The network storage device according to claim 5, wherein the information identifying the application program is transmitted from the terminal when the terminal starts the application program.

9. The network storage device according to claim 5, wherein the circuitry does not change the at least one of the storage regions in accordance with the information identifying the application program when the network storage device does not store information identifying the at least one of the storage regions corresponding to the application program.

10. The network storage device according to claim 1, wherein each of data size of the plurality of storage regions is equal to or smaller than a storage capacity offered by a cloud service of the server.

11. The network storage device according to claim 1, wherein the circuitry changes the at least one of the storage regions in accordance with the instruction information from a terminal connected to the network storage device via the network or the instruction information stored in a predetermined storage location of the server.

12. The network storage device according to claim 1, wherein the circuitry changes the at least one of the storage regions in accordance with sequence information stored in the network storage device.

13. The network storage device according to claim 1, wherein the server is a memory in a terminal connected to the network storage device via the network.

14. A non-transitory computer readable medium including executable instructions, which when executed by a computer cause the computer to:
store data in a plurality of storage regions of a network storage device;
select at least one of the storage regions in accordance with instruction information from a terminal connected to the network storage device via a network;
determine whether a network address of the terminal is the same as a network address of the network storage device;
when the computer determines the network address of the terminal is not the same as the network address of the network storage device, synchronize data stored in the at least one of the storage regions with a server connected to the network storage device via the network; and
when the computer determines the network address of the terminal is the same as the network address of the network storage device, synchronize data stored in the at least one of the storage regions with a server connected to the network storage device via the network only when an instruction from the terminal is received by the computer, and refrain from synchronizing the data stored in the at least one of the storage regions with the server until the instruction from the terminal is received by the computer.

15. An information processing system comprising:
a network storage device;
a server; and
a terminal, wherein
the network storage device comprises:
a plurality of storage regions configured to store data; and
circuitry configured to:
select at least one of the storage regions in accordance with instruction information from the terminal connected to the network storage device via a network;
determine whether a network address of the terminal is the same as a network address of the network storage device;
when the circuitry determines the network address of the terminal is not the same as the network address of the network storage device, synchronize data stored in the at least one of the storage regions with a server connected to the network storage device via the network; and
when the circuitry determines the network address of the terminal is the same as the network address of the network storage device, synchronize data stored in the at least one of the storage regions with a server connected to the network storage device via the network only when an instruction from the terminal is received by the circuitry, and refrain from synchronizing the data stored in the at least one of the storage regions with the server until the instruction from the terminal is received by the circuitry, and
the server is configured to:
store the data synchronized with the network storage device; and
output the stored data to the terminal in response to a request received from the terminal.

16. The information processing system according to claim 15, wherein the circuitry selects the at least one of the storage regions in accordance with the instruction information from the terminal connected to the network storage device via the network.

17. The information processing system according to claim 15, wherein
the circuitry acquires information identifying an application program being executed on the terminal, and
the circuitry selects the at least one of the storage regions in accordance with the information identifying the application program.

* * * * *